United States Patent [19]
Schutz

[11] Patent Number: 5,655,679
[45] Date of Patent: Aug. 12, 1997

[54] PALLET CONTAINER FOR THE TRANSPORT AND THE STORAGE OF LIQUIDS

[75] Inventor: Udo Schutz, Selters, Germany

[73] Assignee: Protechna S.A., Fribourg, Switzerland

[21] Appl. No.: 550,347

[22] Filed: Oct. 30, 1995

[30] Foreign Application Priority Data

Oct. 29, 1994 [DE] Germany ............... 44 38 739.3

[51] Int. Cl.⁶ ..................................... B65D 90/04
[52] U.S. Cl. ..................... 220/403; 220/465; 220/689
[58] Field of Search ............................ 220/403, 404, 220/689, 465

[56] References Cited

U.S. PATENT DOCUMENTS

| | | | |
|---|---|---|---|
| 2,043,694 | 6/1936 | Battles | 220/689 |
| 4,625,892 | 12/1986 | Carlin, Jr. | 220/465 |
| 5,154,308 | 10/1992 | Larson | 220/465 |
| 5,174,466 | 12/1992 | Matyja | 220/465 |
| 5,217,138 | 6/1993 | Nichols | 220/403 |

FOREIGN PATENT DOCUMENTS 42 06 945  3/1993  Germany.
44 38 739  10/1995  Germany.

*Primary Examiner*—Stephen J. Castellano
*Attorney, Agent, or Firm*—Young & Thompson

[57] ABSTRACT

A pallet container which can be used as a disposable or reusable container for transport and storage especially of environmentally hazardous liquids has as main components a parallelepipedal inner container (2), an outer jacket (3) made of lattice, a pallet (7) with a flat bottom tray (8) made of sheet metal which is fastened to a pallet frame (9) made of steel pipe and which accommodates an inner container (2) form fittingly, as well as a lattice-like cover (10) with two V-shaped lattice bars (11, 12). The inner container (2) comprises an outer shell (13) made of sheet steel with a jacket (14), a bottom part (15) with a drain bottom (16) and cover (17) as well as elastic inner shell (18) made of plastic with a drain bottom (19) matched to a drain bottom (16) of the outer shell (13). The jacket (14) and cover (17) or bottom part (15) of the outer shell (13) of the inner container (2) are folded to9ether or clinched with one another. The plastic inner shell (18) of inner container (2) can be replaced after removing the folded seam connection or the clinch connection from the cover (17) and the jacket (14) of the outer shell (13).

1 Claim, 2 Drawing Sheets

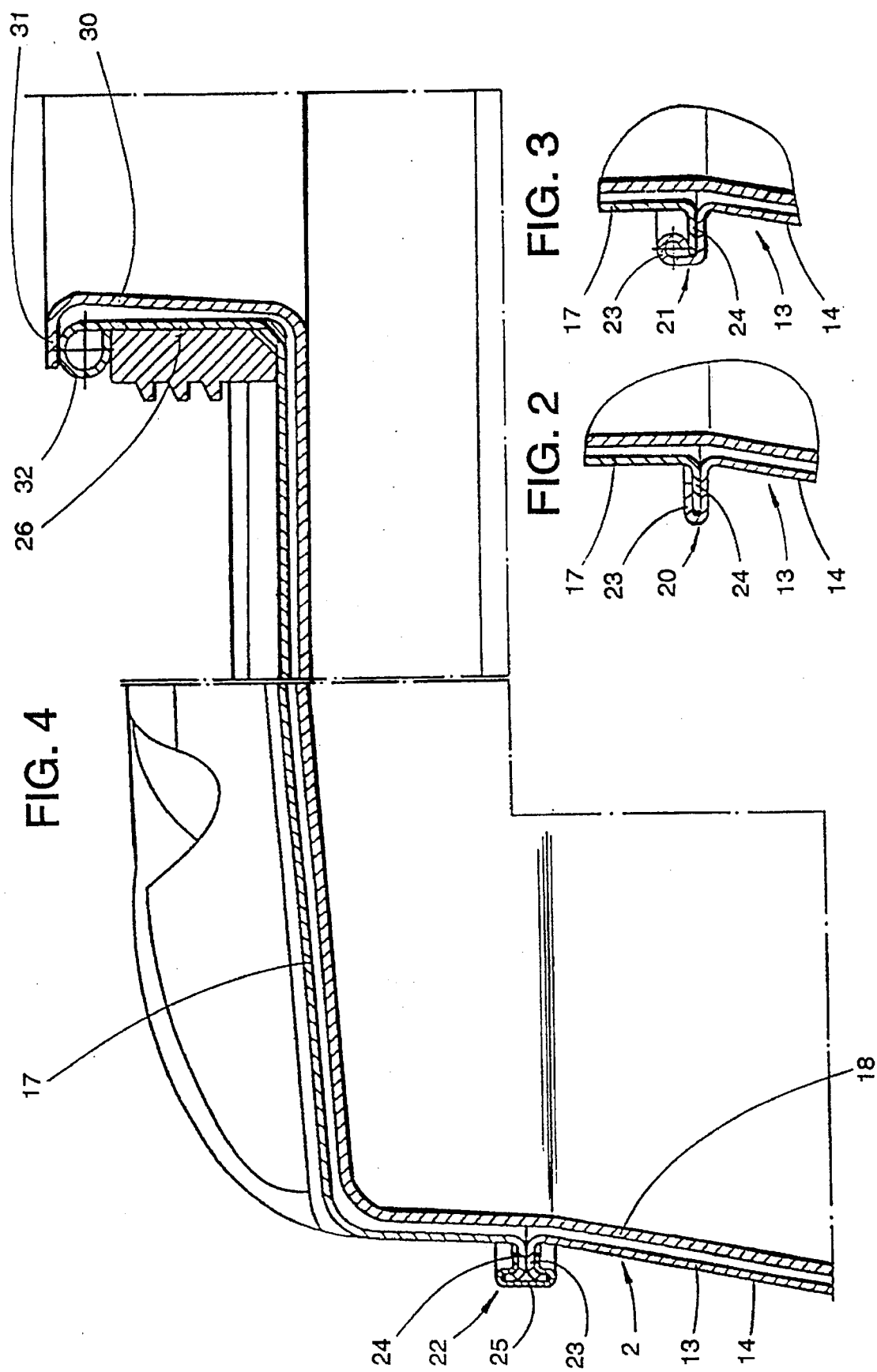

PALLET CONTAINER FOR THE TRANSPORT AND THE STORAGE OF LIQUIDS

FIELD OF THE INVENTION

The invention relates to a pallet container for the transport and the storage of liquids, with a parallelepiped-shaped inner container with a filler neck which can be sealed and a discharge connecting piece for the connection of a drain fitting, which has a drain bottom and outer jacket made of lattice or sheet-metal jacket and is in a flat bottom tray made of sheet-metal or plastic and designed as a pallet.

BACKGROUND OF THE INVENTION

The need to save raw materials as well as transport and storage costs and the legal environmental protection regulations force the relevant industry to fill with liquids large-volume containers of the generic type which are offered on the market and which can be used as reusable containers according to DE 42 06 945 C1 instead of as in the past barrels with significantly smaller capacity, for transport and for storage.

The generic pallet container does not offer the safety required for the transport of environmentally hazardous liquids of a high hazard class.

SUMMARY OF THE INVENTION

The object of the invention is to develop the generic pallet container with respect to optimum transport safety for dangerous liquids as well as an economical reconditioning capacity for a multiple use.

This object is achieved according to the invention by a pallet container with the features of the claim.

BRIEF DESCRIPTION OF THE DRAWINGS

The new pallet container is explained below based on the drawings. Here:

FIG. 2 shows a cutaway representation of a folded seam connection of cover and jacket of the inner container of the pallet container, FIG. 3 shows a further embodiment of the folded seam connection of cover and jacket of the inner container and FIG. 4 shows a clinch connection of cover and jacket of the inner container.

DETAILED DESCRIPTION OF THE INVENTION

Figure 1:
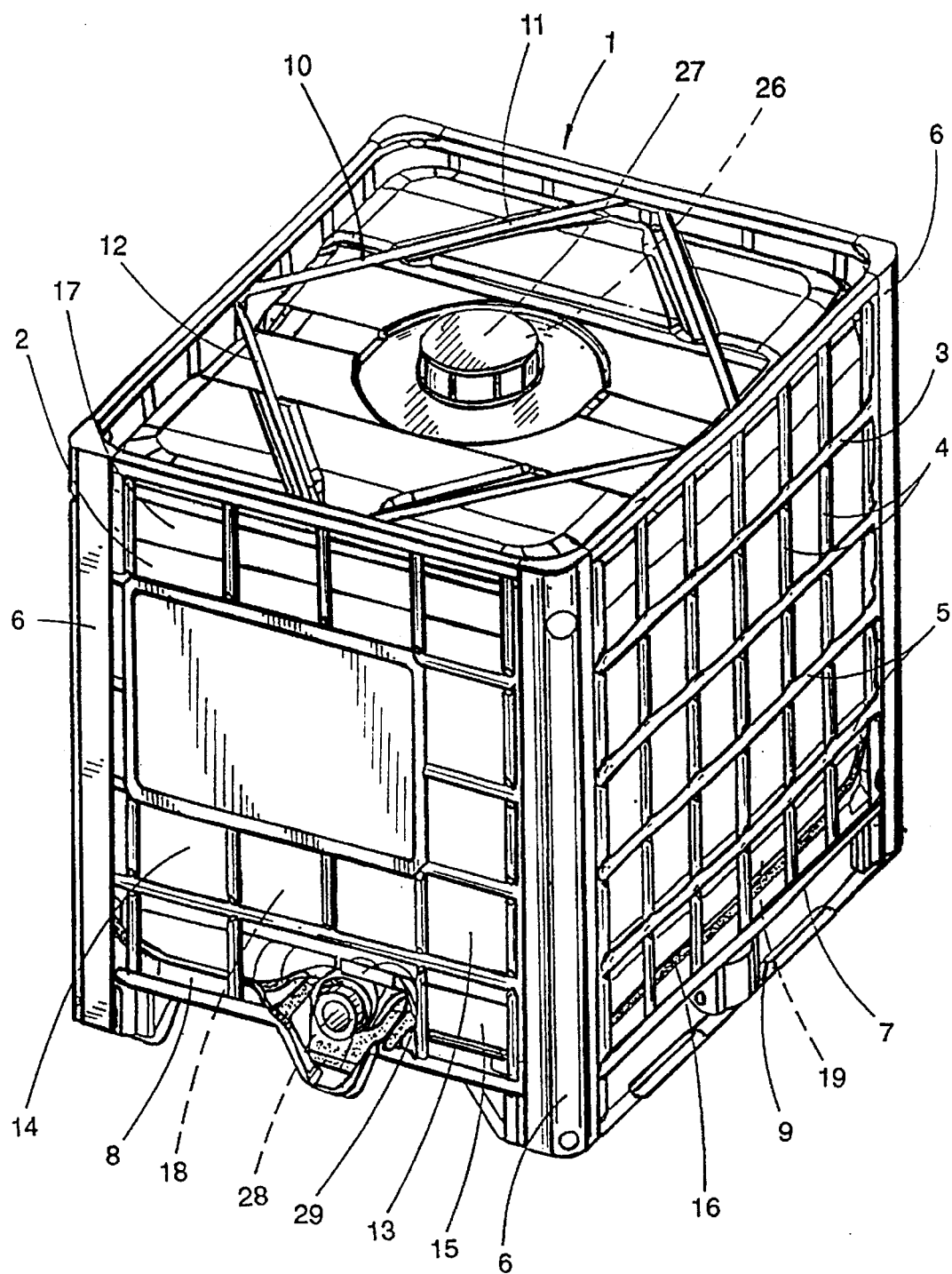
FIG. 1 shows a perspective representation of the pallet container.

Pallet container 1 that can be used as a disposable or reusable container for the transport and the storage especially of environmentally hazardous liquids of a high hazard class has as main components parallelepiped-shaped inner container 2 with rounded corners, outer jacket 3 which is made of crossing vertical and horizontal metal lattice bars 4, 5 and which is reinforced by four corner supports 6 made of steel with an angle section, pallet 7 with flat bottom tray 8 made of sheet-metal which is fastened to pallet frame 9 made of steel pipe with European standard length and width dimensions and which accommodates inner container 2 by form-fit, as well as lattice-like cover 10 with two V-shaped lattice bars 11, 12 for the protection of inner container 2 and for stiffening of lattice jacket 3.

Inner container 2 consists of outer shell 13 made of sheet steel with jacket 14, bottom part 15 with drain bottom 16 and cover 17 as well as of liquid-tight, elastic inner shell 18 made of polyethylene and produced as a blown part, with drain bottom 19 matched to drain bottom 16 of outer shell 13.

Jacket 14 and cover 17 of outer shell 13 of inner container 2 are fastened to one another by folded seam connections 20, 21 according to FIGS. 2 and 3 or by clinch connection 22 according to FIG. 4.

To produce horizontal folded seam connection 20 according to FIG. 2, beveled upper jacket edge 23 which is wider than cover edge 24 is bent inward around cover edge 24 and in the production of vertical folded seam connection 21 according to FIG. 3, jacket edge 23 is rolled inward around cover edge 24.

In the production of clinch connection 22 according to FIG. 4, a pre-profiled lock ring 25 made of sheet metal is mounted on cover edge 24 which is beveled upward and rolled around jacket edge 23 which is beveled downward.

In the same way, jacket 14 and bottom part 15 of outer shell 13 of inner container 2 are folded together or clinched with one another.

Cover 17 of outer shell 13 of inner container 2 is equipped with filler neck 26 which can be sealed by a screw cap 27 and bottom part 15 of outer shell 13 is equipped with discharge connecting piece 28 with drain cock 29.

When assembling inner container 2, first jacket 14 and bottom part 15 of outer shell 13 are folded together or clinched with one another. Then, plastic inner shell 18 is inserted into open outer shell 13, the discharge connecting piece of inner shell 18, not shown, being fitted into discharge connecting piece 28 of outer shell 13. At this point filler neck 30 of elastic inner shell 18 is passed through filler neck 26 from inside in cover 17 of outer shell 13 and locked with its upper annular edge 31 to upper edge 32, which is rerolled outward, of filler neck 26 in cover 17 of outer shell 13. Finally, jacket 14 and cover 17 of outer shell 13 are folded together or clinched with one another.

To recondition pallet container 1, inner container 2 is removed from the latter after opening cover 10 of lattice jacket 3, and plastic inner shell 18 of inner container 2 can be replaced after removing folded seam connection or clinching connection 20, 21 or 22 from cover 17 and jacket 14 of outer shell 13.

I claim:

1. A pallet container for transporting and storing liquids, comprising:

a parallelepipedal inner container (2) having a sealable filler neck (26) and a discharge connecting piece (28) for connection to a drain fitting;

an outer supporting lattice structure (3); and a pallet (7) having a flat bottom tray (8) fastened to pallet frame (9) which accommodates the inner container;

said inner container (2) having an outer shell (13) made of sheet steel; said outer shell (13) including a jacket (14), a bottom part (15) having a drain bottom (16), and a cover (17); said sealable filler neck (26) being located in the cover (17) of the outer shell (13); said inner container (2) including a liquid-tight, elastic inner shell (18) made of plastic and having a drain (19) matched to said drain bottom (16), and a filling neck (30); said jacket (14) of said outer shell (13) being form-fitted by a joint connection to said bottom part (15) and to said cover (17); said filling neck (30) of said inner shell (18) passing through the sealable filler neck (26) in said cover, and being locked with an upper annular edge (31) to an upper edge (32) of said filler neck (26).

* * * * *